No. 857,489. PATENTED JUNE 18, 1907.
J. SANDERS.
WIRE STRETCHER AND SPLICER.
APPLICATION FILED MAR. 2, 1907.
2 SHEETS—SHEET 1.
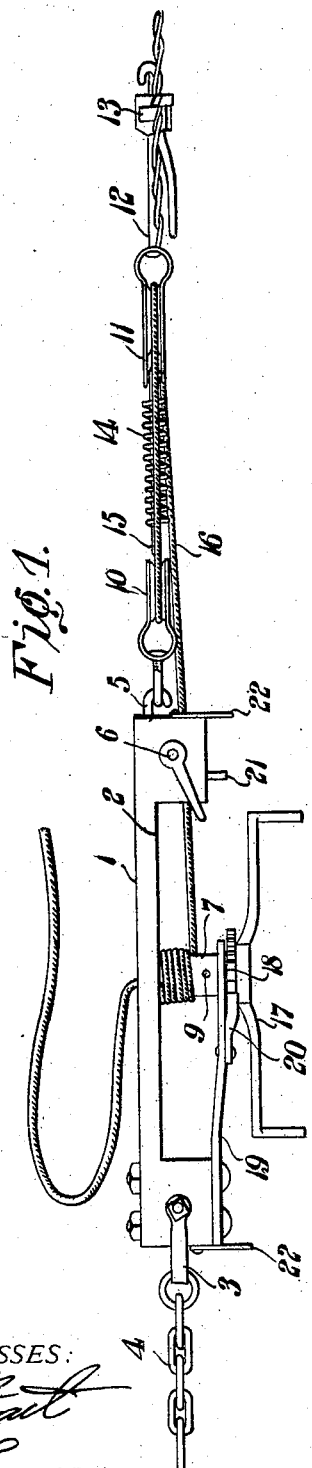
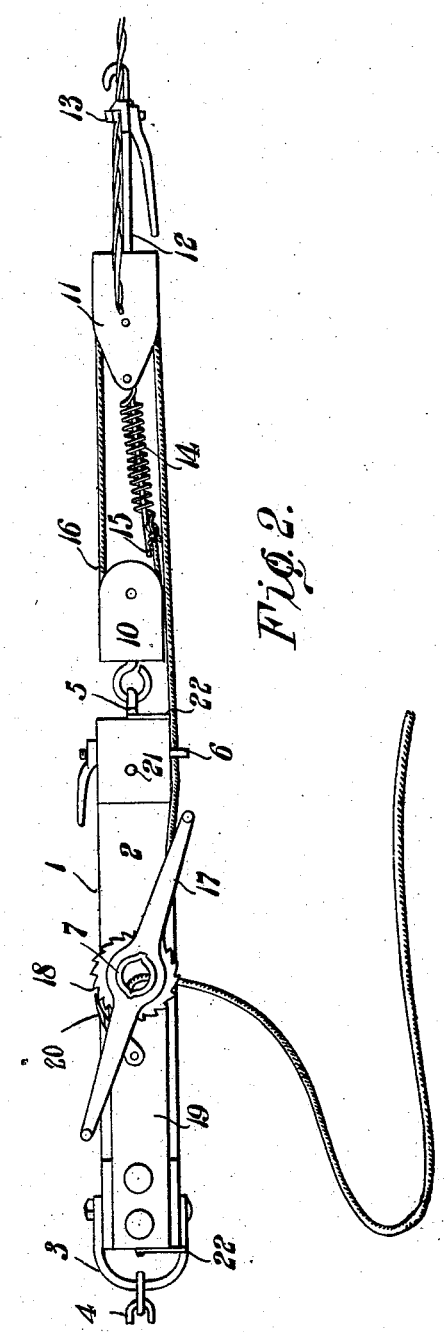
WITNESSES:
Joel Sanders, INVENTOR
By
ATTORNEYS
THE NORRIS PETERS CO., WASHINGTON, D. C.

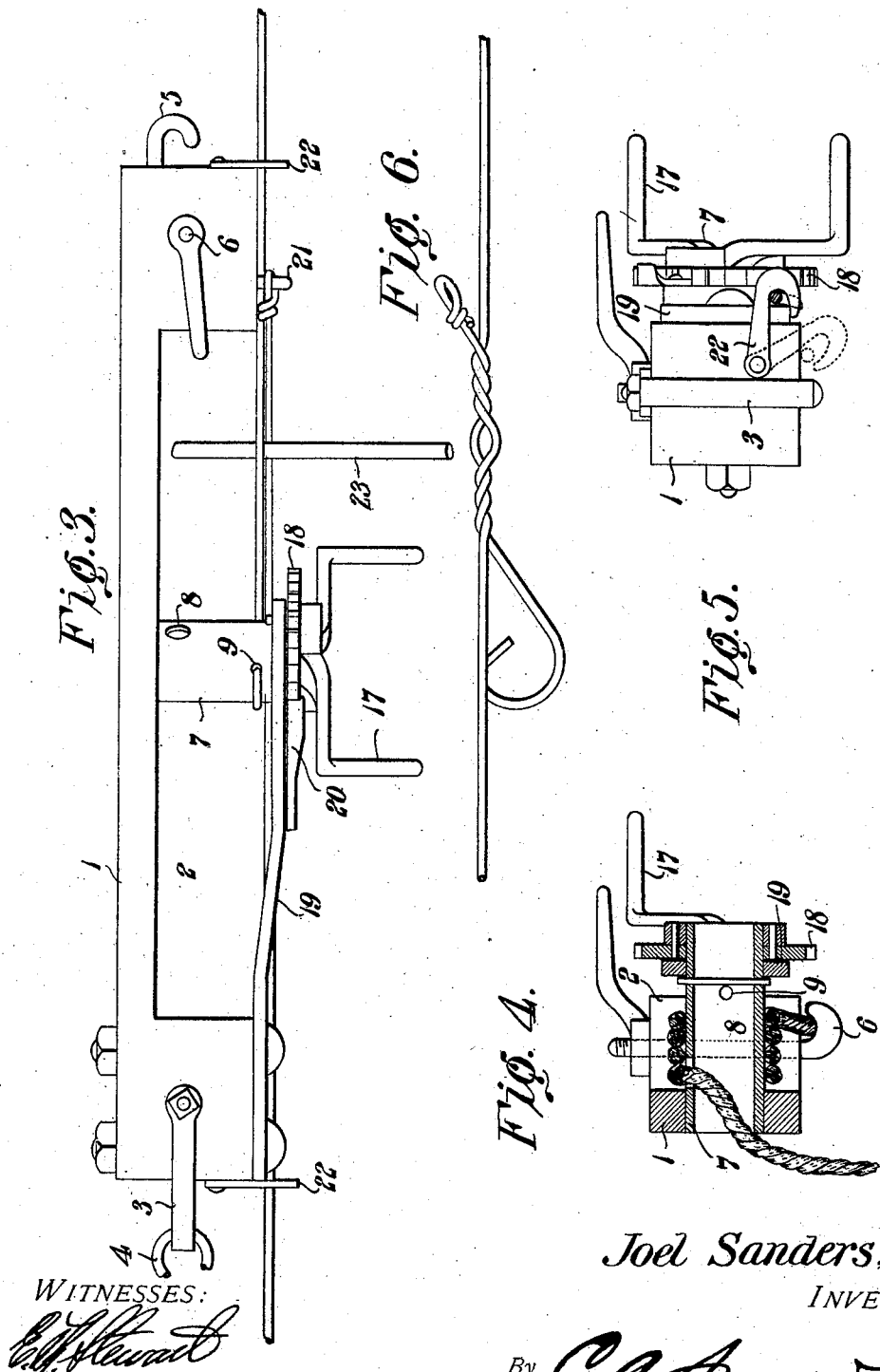

UNITED STATES PATENT OFFICE.

JOEL SANDERS, OF BLISS, IDAHO.

WIRE STRETCHER AND SPLICER.

No. 857,489.  Specification of Letters Patent.  Patented June 18, 1907.

Application filed March 2, 1907. Serial No. 360,188.

*To all whom it may concern:*

Be it known that I, JOEL SANDERS, a citizen of the United States, residing at Bliss, in the county of Lincoln and State of Idaho, have invented a new and useful Wire Stretcher and Splicer, of which the following is a specification.

This invention has relation to wire stretchers and splicers and it consists in the novel construction and arrangement of its parts as hereinafter shown and described.

The object of the invention is to provide an implement which may be readily and conveniently used for stretching wire or for splicing the ends of wire strands together. The implement is provided with means for determining the tension or degree to which a wire is stretched and the same means affords a gage whereby the wire may not be subjected to too great tension.

In the accompanying drawing:—Figure 1 is a top plan view of the implement arranged as a wire stretcher. Fig. 2 is a side elevation of the same. Fig. 3 is a side elevation of the implement arranged as a splicer. Fig. 4 is a transverse sectional view of the implement. Fig. 5 is an end elevation of the same, and Fig. 6 is a plan view showing the ends of two strands of wire spliced together.

The implement consists of the bar 1 which is provided at the middle of one of its longitudinal edges with the recess 2. The bail or clevis 3 is pivoted at one end of the bar 1 and to said bail is attached a chain 4. The hook 5 is attached to the opposite end of the said bar 1 and the clamp hook 6 is also attached to the last said end of the said bar. The hollow shaft 7 is journaled in the bar 1 and extends transversely through the recess 2. Said shaft is provided with a perforation 8 and a perforation 9. The block 10 is engaged with the hook 5. When the implement is used as a wire stretcher the block 11 is also employed. Said block is provided with a swiveled link 12 which in turn is provided with a wire clamp 13. The coil spring 14 is attached at one end to the block 11 and the indicator rod 15 lies within the convolutions of the said springs and is attached at one end to the block 11. The tackle 16 is attached at one end to the coil spring 14 and passes around the pulley of the block 10 thence around the pulley of the block 11, thence, through the clamp hook 6 and around the shaft 7 with its end passing through the perforation 8 of the said shaft and out through the end of the shaft. The shaft 7 is provided with the crank handles 17 and a ratchet wheel 18. The strap 19 is secured at one end to one of the ends of the bar 1 and the said shaft 7 is journaled in the opposite end of the said strap. The pawl 20 is mounted upon the strap 19 and is adapted to engage the ratchet wheel 18. One end of the bar 1 is provided with a pin 21 and each end of the said bar is provided with a pivoted hook 22.

When the implement is used as a wire stretcher the parts are arranged as illustrated in Figs. 1, 2 and 4 of the drawing, in which case the chain 4 is attached to a fixed object and the wire to be stretched is secured in the clamp 13. The tackle 16 is then wound upon the shaft 7 by means of the crank handle 17 and when the convolutions of the spring 14 open up and come in register with marks or a mark previously placed upon the rod 15 an indication may be observed that the wire strand is sufficiently stretched. The marks upon the rod 15 may be placed with relation to the spring 14 in accord with tests previously made which have demonstrated the tensile strength of wire strands of different gage. Consequently by observing the said indicator several wires may be drawn to a uniform degree of tension and the possibility of breaking a wire is reduced. Should, at any time, the tackle 16 accumulate to an undesirable degree upon the shaft 7 the clamp hook 6 may be tightened against the said tackle when the tackle may be unwound from the said shaft and then pulled through the perforation 8 when the operation of drawing the blocks 10 and 11 together may be continued after releasing the tackle from the clamp hook 6.

When the implement is used as a splicer a loop is made in the end of one strand of wire which loop is placed over the pin 21. The end of the other strand is then hooked into the perforation 9 of the shaft 7 and the said shaft is rotated by means of the handles 17, thus, one of the strands of wire is wound upon the shaft 7 and when sufficiently taut an implement such as a rod 23 is placed between the said strands at a point between the shaft 7 and the pin 21 and by turning the said implement laterally with relation to the bar 1 the ends of the strands are twisted together in a manner as illustrated in Fig. 6. Thus, the ends of the strands are spliced together.

Having described my invention what I claim as new and desire to secure by Letters-Patent is:—

An implement of the character described comprising a bar provided with a recess at the middle of one of its longitudinal edges, attaching means located at the ends thereof, a shaft journaled for rotation upon the bar and traversing the said recess, a strap attached to one end of the bar and receiving the end portion of the shaft and terminating short of the other end of the bar, a pin attached to the last said end of the bar, means for rotating the shaft and means for holding said shaft against rotation.

In testimony that I claim the foregoing as my own, I have hereto affixed my signature in the presence of two witnesses.

JOEL SANDERS.

Witnesses:
 EDW. M. ROBERTS,
 CHAS. B. AMOSS.